(12) United States Patent
Shim (10) Patent No.: US 11,221,931 B2
(45) Date of Patent: Jan. 11, 2022

(54) MEMORY SYSTEM AND DATA PROCESSING SYSTEM

(71) Applicant: SK hynix Inc., Gyeonggi-do (KR)

(72) Inventor: Eung-Bo Shim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 86 days.

(21) Appl. No.: 16/674,935

(22) Filed: Nov. 5, 2019

(65) Prior Publication Data

US 2020/0226044 A1 Jul. 16, 2020

(30) Foreign Application Priority Data

Jan. 15, 2019 (KR) ........................ 10-2019-0005161

(51) Int. Cl.
| | | |
|---|---|---|
| G01R 31/28 | (2006.01) | |
| G06F 11/263 | (2006.01) | |
| G06F 11/273 | (2006.01) | |
| G06F 11/22 | (2006.01) | |
| G06K 9/62 | (2006.01) | |
| G06F 12/02 | (2006.01) | |
| G06F 13/16 | (2006.01) | |

(52) U.S. Cl.
CPC ........ *G06F 11/263* (2013.01); *G06F 11/2268* (2013.01); *G06F 11/273* (2013.01); *G06F 12/0246* (2013.01); *G06F 12/0292* (2013.01); *G06F 13/1694* (2013.01); *G06K 9/6256* (2013.01)

(58) Field of Classification Search
CPC .. G06F 11/263; G06F 11/2268; G06F 11/273; G06F 12/0246; G06F 12/0292; G06F 13/1694; G06K 9/6256
See application file for complete search history.

(56) References Cited

U.S. PATENT DOCUMENTS

| | | |
|---|---|---|
| 7,065,624 B1 | 6/2006 | Zahavi |
| 7,085,904 B2 | 8/2006 | Mizuno et al. |
| 8,037,267 B2 | 10/2011 | Jinno et al. |
| 8,645,610 B2 | 2/2014 | Chang et al. |
| 8,775,988 B2 | 7/2014 | Lavin et al. |

(Continued)

FOREIGN PATENT DOCUMENTS

| | | |
|---|---|---|
| CN | 103902474 A | 7/2014 |
| CN | 105144106 A | 12/2015 |

(Continued)

OTHER PUBLICATIONS

DDR5 Full Spec Draft Rev0.5g, 2011, 1848.99A, JEDEC.

(Continued)

*Primary Examiner* — Christine T. Tu (74) *Attorney, Agent, or Firm* — IP & T Group LLP (57) ABSTRACT

A data processing system may include: a host; and a memory system including a plurality of memory units and a controller coupled to the plurality of memory units. The controller may include a memory manager suitable for acquiring characteristic data from serial presence detect (SPD) components in the plurality of memory units when power is supplied, providing the characteristic data to the host, setting an operation mode of each of the plurality of memory units based on the characteristic data, and performing memory training, and the host may perform interface training with the controller.

12 Claims, 8 Drawing Sheets

(56) References Cited

U.S. PATENT DOCUMENTS

| | | | |
|---|---|---|---|
| 8,839,032 B2 | 9/2014 | Walton et al. | |
| 8,954,698 B2 | 2/2015 | Schenfeld et al. | |
| 8,954,701 B2 | 2/2015 | Schenfeld et al. | |
| 9,104,586 B2 | 8/2015 | Schenfeld et al. | |
| 9,104,587 B2 | 8/2015 | Schenfeld et al. | |
| 9,110,818 B2 | 8/2015 | Schenfeld et al. | |
| 9,128,662 B2 | 9/2015 | Kim et al. | |
| 9,152,332 B2 | 10/2015 | Kopylovitz et al. | |
| 9,159,374 B2 | 10/2015 | Kim et al. | |
| 9,256,547 B2 | 2/2016 | Schenfeld et al. | |
| 9,390,047 B2 | 7/2016 | Schenfeld et al. | |
| 9,396,026 B2 | 7/2016 | Ichikawa et al. | |
| 9,442,854 B2 | 9/2016 | Hyde et al. | |
| 9,535,606 B2 | 1/2017 | Krithivas et al. | |
| 2004/0054776 A1 | 3/2004 | Klotz et al. | |
| 2006/0259621 A1 | 11/2006 | Ranganathan et al. | |
| 2008/0222348 A1 | 9/2008 | Mosek | |
| 2008/0309349 A1 | 12/2008 | Sutono | |
| 2009/0037164 A1 | 2/2009 | Gaither et al. | |
| 2009/0249018 A1 | 10/2009 | Nojima et al. | |
| 2009/0276567 A1 | 11/2009 | Burkey | |
| 2010/0228956 A1 | 9/2010 | Sakamaki | |
| 2011/0041005 A1 | 2/2011 | Selinger | |
| 2011/0231743 A1 | 9/2011 | Sakamaki | |
| 2012/0005556 A1 | 1/2012 | Chang et al. | |
| 2012/0179823 A1 | 7/2012 | Hatasaki et al. | |
| 2012/0191964 A1* | 7/2012 | Lee | G06F 11/2289 713/2 |
| 2013/0107443 A1 | 5/2013 | Kim et al. | |
| 2013/0163175 A1 | 6/2013 | Kim et al. | |
| 2013/0275703 A1 | 10/2013 | Schenfeld et al. | |
| 2013/0275704 A1 | 10/2013 | Schenfeld et al. | |
| 2013/0275705 A1 | 10/2013 | Schenfeld et al. | |
| 2013/0275706 A1 | 10/2013 | Schenfeld et al. | |
| 2013/0275707 A1 | 10/2013 | Schenfeld et al. | |
| 2014/0006898 A1 | 1/2014 | Sharon et al. | |
| 2015/0106564 A1 | 4/2015 | Kopylovitz et al. | |
| 2015/0188649 A1 | 7/2015 | Buckler et al. | |
| 2015/0254108 A1 | 9/2015 | Kurtzman et al. | |
| 2015/0370697 A1 | 12/2015 | Schenfeld et al. | |
| 2016/0154755 A1 | 6/2016 | Schenfeld et al. | |
| 2016/0328156 A1* | 11/2016 | Swarbrick | G06F 13/4234 |
| 2018/0260158 A1 | 9/2018 | Marripudi et al. | |
| 2019/0310784 A1* | 10/2019 | Kim | G06F 3/0604 |

FOREIGN PATENT DOCUMENTS

| | | |
|---|---|---|
| CN | 106104485 A | 11/2016 |
| CN | 107273302 A | 10/2017 |
| JP | 2009-238114 A | 10/2009 |
| JP | 2011-123746 A | 6/2011 |
| KR | 10-2005-0033060 | 4/2005 |
| KR | 1020160022242 | 2/2016 |
| KR | 1020160072890 | 6/2016 |
| KR | 10-2016-0132432 A | 11/2016 |
| KR | 1020160144560 | 12/2016 |
| KR | 10-2017-0066083 | 6/2017 |
| WO | 2011/070803 A1 | 6/2011 |

OTHER PUBLICATIONS

Gen-Z-Core-Specification-version-1.0, Feb. 13, 2018, pp. 1-983, Gen-Z Consortium.

Office Action issued by the Chinese Patent Office dated Sep. 17, 2021.

Office Action issued by the Korean Intellectual Property Office dated Nov. 10, 2021.

* cited by examiner

MEMORY SYSTEM AND DATA PROCESSING SYSTEM

CROSS-REFERENCE TO RELATED APPLICATION

This application claims priority under 35 U.S.C. § 119 to Korean Patent Application No. 10-2019-0005161, filed on Jan. 15, 2019, which is incorporated herein by reference in its entirety.

BACKGROUND

1. Field

Various embodiments relate to a memory system, a data processing system including the memory system, and an operation method of the data processing system.

2. Discussion of the Related Art

With the advent of the fourth industrial revolution generation, data have become the most important resources for businesses of companies. Therefore, the demand for the latest technology capable of quickly transmitting and analyzing large-scale data is gradually increasing. For example, it is expected that the spread of artificial intelligence (AI), autonomous driving, robots, digital health care, virtual reality (VR), augmented reality (AR) and smart homes will increase the demand for servers or data centers.

A legacy data center has a structure that includes resources (for example, computing, networking and storage) in one piece of equipment. However, a future large-scale data center may have a structure that separately configures resources and logically reconfigures resources. For example, a large-scale data center may have a structure that can modularize resources at the rack level, reconfigure the resources depending on their intended use, and supply the resources. Therefore, there is a demand for a convergence storage or memory device suitable for a future large-scale data center.

A convergence storage for a future large-scale data center may include a plurality of memory units. When a host senses all storage resources, i.e. a plurality of memory units, sets the operation modes of the storage resources, and performs memory training as in the legacy data center, the processing burden of the host and the booting time may be increased during a booting operation of the data center.

SUMMARY

Various embodiments are directed to a memory system capable of sensing a plurality of memory units during a booting operation of a data processing system, setting operation modes of the memory units, and shortening the time required for performing memory training, a data processing system including the memory system, and an operating method of the data processing system.

In an embodiment, a data processing system may include: a host; and a memory system including a plurality of memory units and a controller coupled to the plurality of memory units. The controller may include a memory manager suitable for acquiring characteristic data from serial presence detect (SPD) components in the plurality of memory units when power is supplied, providing the characteristic data to the host, setting an operation mode of each of the plurality of memory units based on the characteristic data, and performing memory training, and wherein the host may perform interface training with the controller.

In an embodiment, there is provided an operation method of a data processing system which includes a host and a memory system including a plurality of memory units. The operation method may include: acquiring, by the memory system, characteristic data from serial presence detect (SPD) components of the respective memory units when power is supplied; providing, by the memory system, the characteristic data to the host; setting, by the memory system, an operation mode of each of the memory units based on the characteristic data, and performing memory training; and performing, by the host, interface training with the memory system.

In an embodiment, a memory system may include: a plurality of memory units; and a controller coupled to the plurality of memory units. The controller may include a memory manager suitable for acquiring characteristic data from serial presence detect (SPD) components of the plurality of memory units when power is supplied, providing the characteristic data to the host, setting an operation mode of each of the plurality of memory units based on the characteristic data, and performing memory training.

In an embodiment, a data processing system may include: a host; and a memory system. The memory system may include a memory pool and a controller group coupled to the memory pool, the memory pool including a plurality of memory groups, each memory group including a plurality of memory units, each of the plurality of memory units including a serial presence detect (SPD) component for storing characteristic data, the controller group including a plurality of controllers, each of the controllers coupled to a corresponding memory group, wherein each of the controllers comprises a memory manager suitable for: scanning the corresponding memory group, when power is supplied, to acquire characteristic data from SPD components of the corresponding memory group; performing memory training for the corresponding memory group based on the acquired characteristic data; and providing, to the host, the characteristic data and information on memory units of the corresponding memory group associated with the memory training, and wherein the host performs interface training with the controller based on the characteristic data and the information, and performs data input and output testing for memory units of the corresponding memory group.

DETAILED DESCRIPTION

Various embodiments are described in detail with reference to the accompanying drawings. However, aspects and features of the present invention may be arranged or configured differently than in the embodiments described herein. Thus, the present invention is not limited to the disclosed embodiments.

When one component is referred to as being "connected" or "coupled" to another component, the two components may be directly or indirectly connected or coupled. In the case of indirect connection or coupling, one or more other components may be interposed between the two components.

Various embodiments of the present invention are described in detail below with reference to the accompanying drawings. It is noted that the following description focuses on aspects and features of the present invention; description of well-known material may be omitted in order not to obscure the subject matter of the present invention.

Throughout the specification, reference to "an embodiment," "another embodiment" or the like is not necessarily to one embodiment, and different references to any such phrase are not necessarily to the same embodiment(s).

As used herein, singular forms may include the plural forms as well and vice versa, unless the context clearly indicates otherwise. The articles 'a' and 'an' as used in this application and the appended claims should generally be construed to mean 'one or more' unless specified otherwise or clear from context to be directed to a singular form.

Figure 1:
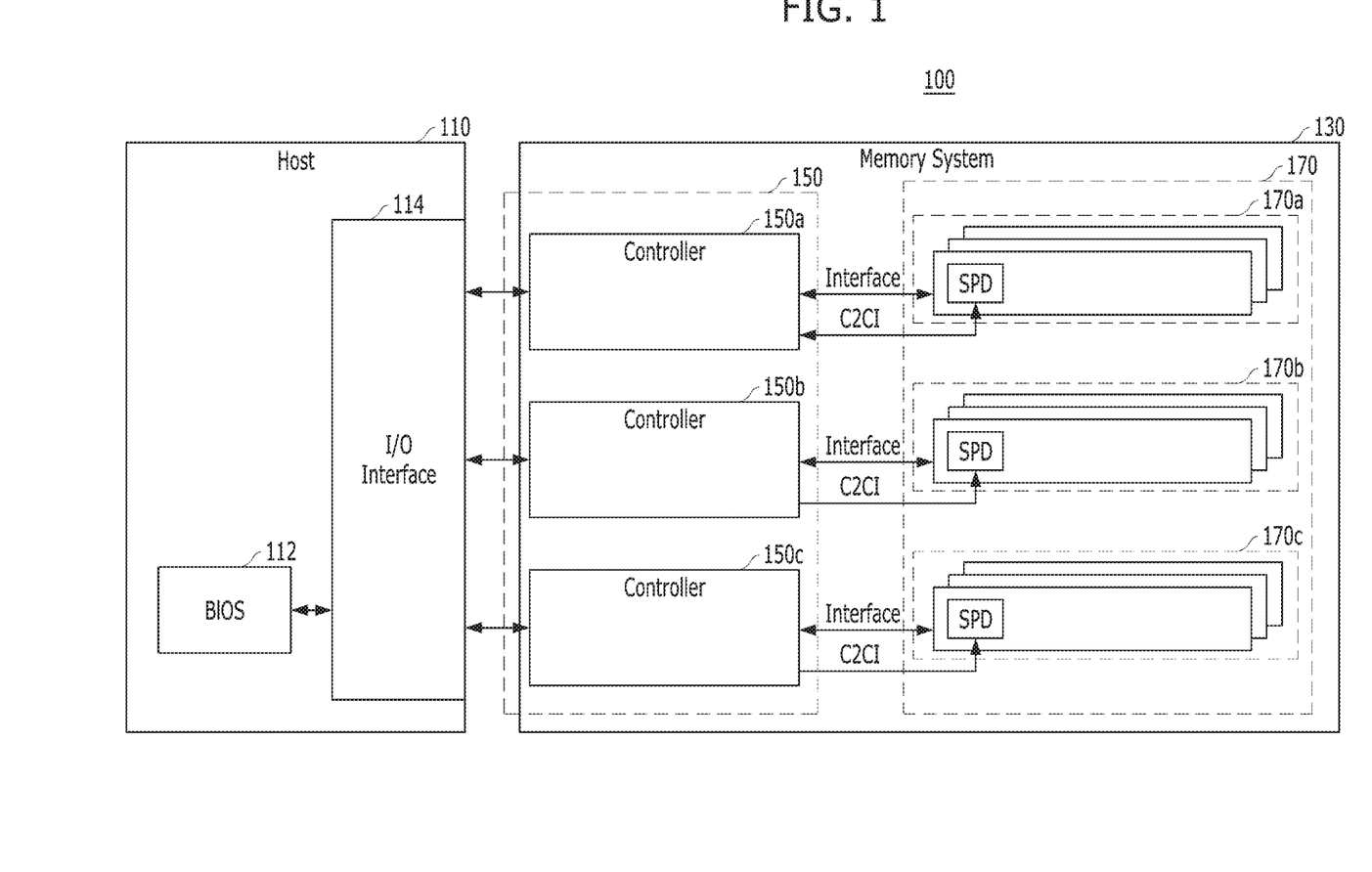
FIG. 1 illustrates a structure of a data processing system in accordance with an embodiment.

FIG. 1 illustrates a structure of a data processing system 100 in accordance with an embodiment.

Referring to FIG. 1, the data processing system 100 may include a host 110 and a memory system 130.

The host 110 may include a basic input and output (input/output) system (BIOS) 112 and an input/output (I/O) interface 114.

The BIOS 112 may sense a peripheral device coupled to the host 110 when power is supplied to the data processing system 100.

The I/O interface 114 may support interfacing between the host 110 and the memory system 130. The I/O interface 114 may output data provided from the host 110 to the memory system 130 and input data received from the memory system 130 to the host 110, using protocols related to one or more wired or wireless communication techniques. For example, the I/O interface 114 may support communication between the host 110 and the memory system 130 according to any of various protocols, such as Peripheral Component Interconnect Express (PCIe), QuickPath Interconnect (QPI) and/or Ethernet. For another example, the I/O interface 114 may support communication between the host 110 and the memory system 130 according to any of various interface specifications, such as Cache Coherent Interconnect for accelerators (CCIX) and/or GEN-Z. The I/O interface 114 may be implemented as I/O ports, processing resources and memory resources which are included in the host 110.

The memory system 130 may include a memory pool 170 including a plurality of memory units and a controller group 150 including one or more controllers for controlling the memory pool 170.

In an embodiment, the memory system 130 may include memory units having different characteristics in order to satisfy various user workloads. That is, one memory system 130 may be a convergence memory device in which a plurality of memories such as a dynamic random access memory (DRAM), a phase change RAM (PCRAM), a magnetic RAM (MRAM), a spin-transfer torque RAM (STT-RAM) and a flash memory are converged. Such a convergence memory device may be utilized for various usage models because the respective memories have different characteristics.

In an embodiment, the plurality of memory units in the memory pool 170 may be grouped by the same kind of memory units. FIG. 1 exemplifies the case in which the plurality of memory units are grouped into a first memory group 170a, a second memory group 170b and a third memory group 170c. The first memory group 170a may contain memory units of a first kind, the second memory group 170b may contain memory units of a second kind, and the third memory group 170c may contain memory units of a third kind, where the first, second and third kinds may be different.

Each of the memory units may include a serial presence detect (SPD) component. The SPD component in each of the memory units may store information such as the type of the corresponding memory unit. Further, the SPD component may store information such as the types, operation timing information, capacity information and manufacturing information of memory devices in the memory unit. Even when power supply to the memory system 130 is cut off, the SPD component needs to retain the data stored therein. Therefore, the SPD component may be configured as a nonvolatile memory device, for example, an electrically erasable programmable read-only memory (EEPROM).

One or more controllers may control data communication between the host 110 and the memory units which are electrically coupled thereto. Each of the controllers may include a processor, a memory, and I/O ports. The processor may be implemented as a microprocessor or a central processing unit (CPU). The memory may serve as a working memory of the controller, and store data for driving the controller.

In an embodiment, the plurality of memory units may be electrically coupled to one controller. For example, a first controller 150a may be coupled to the memory units of the first memory group 170a. The first controller 150a may control data communication between the host 110 and the memory units of the first memory group 170a. Similarly, a second controller 150b may control data communication between the host 110 and the memory units of the second memory group 170b, and a third controller 150c may control data communication between the host 110 and the memory units of the third memory group 170c.

The BIOS 112 of the host 110 may sense the memory system 130, and perform interface training such as clock training of the I/O interface 114.

In accordance with an embodiment, the one or more controllers of the controller group 150 in the memory system 130 may sense the plurality of memory units in the memory pool 170, set operation modes of the memory units, and perform memory training, thereby reducing the processing burden of the host 110.

Furthermore, while the one or more controllers sense the plurality of memory units, set the operation modes of the memory units, and perform memory training, the BIOS 112 may perform another booting operation, thereby improving the booting performance of the data processing system 100.

Since the controllers are operated in parallel to acquire characteristic data of different memory groups, respectively, and perform memory training, the booting time of the data processing system 100 may be shortened. In addition, since each of the controllers acquires characteristic data of the same kind of memory units and performs memory training, the data processing complexity of the memory system 130 including different kinds of memory units may be reduced.

Figure 2:
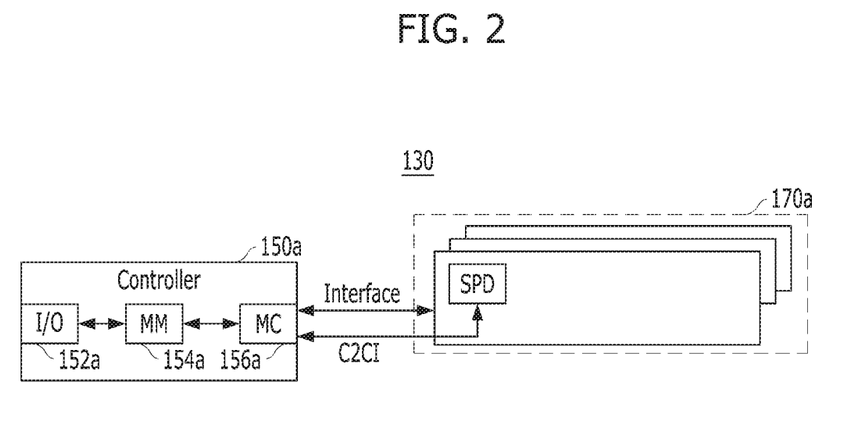
FIG. 2 illustrates a structure of a memory system in a data processing system in accordance with an embodiment.

FIG. 2 schematically illustrates a structure of the memory system 130 in the data processing system 100 in accordance with an embodiment.

FIG. 2 schematically illustrates only the first controller 150a in the memory system 130 and the memory units of the first memory group 170a coupled to the first controller 150a.

The first controller 150a may include an I/O interface 152a, a memory manager (MM) 154a and a memory controller (MC) 156a.

The I/O interface 152a may support interfacing between the host 110 and the first controller 150a.

The I/O interface 152a may provide data of the first controller 150a to the host 110 and provide data received from the host 110 to the MM 154a and the MC 156a, using protocols related to one or more wired or wireless communication techniques. For example, the I/O interface 152a may support communication between the host 110 and the first controller 150a according to any of various protocols, such as PCIe, QPI and Ethernet. Furthermore, the I/O interface 152a may support communication between the host 110 and the first controller 150a according to interface specifications such as CCIX and GEN-Z.

The memory controller 156a may support interfacing between the first controller 150a and the memory units of the first memory group 170a. The memory controller 156a and each of the memory units of the first memory group 170a may be electrically coupled to an interface for exchanging commands, addresses and data.

Furthermore, the memory controller 156a may be electrically coupled to the SPD component in each of the memory units through a chip-to-chip interface (C2CI), for example, a system management bus (SMBus), a serial peripheral interface (SPI), an inter-integrated circuit (I2C), or an improved inter-integrated circuit (I3C).

In an embodiment, the memory manager 154a may sense the memory units of the first memory group 170a by acquiring the characteristic data of the memory units from the respective SPD components through the memory controller 156a, when power supplied to the memory system 130.

Based on the acquired characteristic data, the memory manager 154a may set the operation modes of the memory units, and perform memory training to optimize memory channels between the first controller 150a and the respective memory units.

For example, the memory manager 154a may set the operation modes of the memory units to any of various operation modes, such as burst length, burst type, column access strobe (CAS) latency, test mode and delay locked loop (DLL) reset. The memory manager 154a may control the memory controller 156a to perform write and/or read leveling, address training, and clock training.

The memory manager 154a may provide the acquired characteristic data to the host 110 through the I/O interface 152a.

The structures of the second and third controllers 150b and 150c may correspond to the structure of the first controller 150a.

Figure 3:
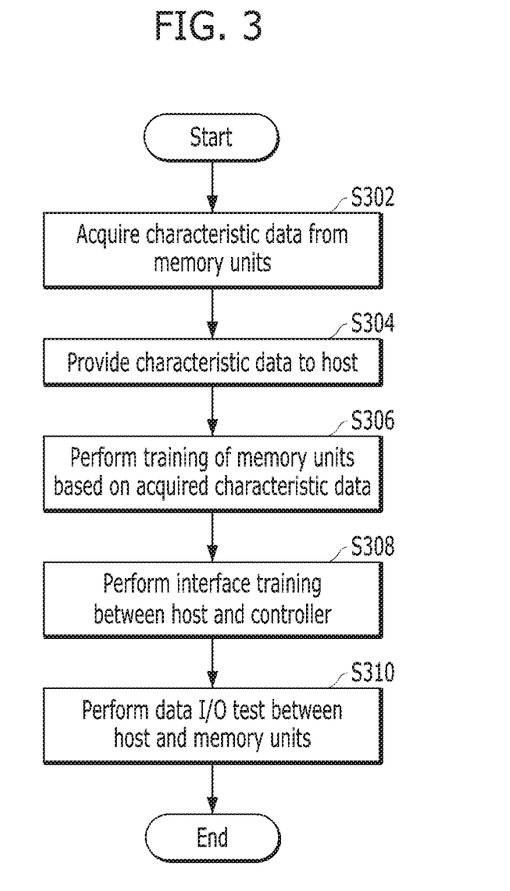
FIG. 3 is a flowchart illustrating an operation of a data processing system in accordance with an embodiment.

FIG. 3 is a flowchart illustrating an operation of the data processing system 100 in accordance with an embodiment.

Power may be supplied to the host 110 and the memory system 130 in the data processing system 100. When power is supplied to the memory system 130, the one or more controllers of the controller group 150 may acquire characteristic data from the SPD components of the memory units which are electrically coupled to the one or more controllers, through a C2CI, for example, a SMBus, SPI, I2C, I3C or the like, in step S302.

In an embodiment, each of the one or more controllers may sense the same kind of memory units such that the memory system 130 can sense the plurality of memory units having different characteristics.

In step S304, the one or more controllers may provide the characteristic data to the host 110.

For example, the BIOS 112 of the host 110 may sense the first controller 150a which is electrically coupled to the host 110. The BIOS 112 may perform initial training of the I/O interface 114 to perform data input and output with the first controller 150a. When the initial training is completed, the host 110 may acquire the characteristic data of the memory units of the first memory group 170a from the memory manager 154a.

That is, although the BIOS 112 does not access the SPD components of the individual memory units, the host 110 may acquire the characteristic data of the plurality of memory units from the one or more controllers, thereby acquiring information as to the types of the memory units coupled to the host 110, as well as the types, operation timing information, capacity information and manufacturing information of the memory devices in each of the memory units.

In an embodiment, the one or more controllers may provide the host 110 with the characteristic data of the memory units coupled thereto in a table format. The table format may include, as fields, the types of the memory units and the types, operation timing information, capacity information and manufacturing information of the memory devices included in each of the memory units.

In step S306, each of the one or more controllers may set the operation modes of the memory units which are electrically coupled to thereto, based on the characteristic data acquired from the SPD components. Further, each controller may perform memory training between the controller and the corresponding memory units based on the characteristic data acquired from the SPD components.

In an embodiment, each of the one or more controllers may perform training of the same kind of memory units which are electrically coupled thereto. Thus, multiple controllers may perform training on different kinds of memory units, respectively. As a result, the memory system 130 may perform memory training of the plurality of memory units having different characteristics, which are included in the memory pool 170.

In an embodiment, the one or more controllers may store the operation mode setting data and the memory training result data, after the training is ended. An embodiment in which the memory manager 154a stores the operation mode setting data and the memory training result data is described in more detail with reference to FIGS. 4 and 5.

In step S308, the host 110 may perform fine training of the I/O interface 114, i.e., interface training.

For example, the host 110 may finely adjust a clock of the I/O interface 114 in order to perform data input and output (I/O) operations with the memory units of the first memory group 170a through the I/O interface 152a of the first controller 150a.

When the one or more controllers complete memory training with the memory units electrically coupled thereto and the host 110 completes training of the I/O interface 114, the host 110 may perform data I/O operations on each of the memory units of the memory pool 170. Therefore, the BIOS 112 may not perform memory training of each of the memory units.

In step S310, the host 110 may provide read and write commands to the plurality of memory units, in order to test data I/O operations between the host 110 and the memory units.

When steps S302 to S310 are completed, the host 110 may allocate one or more memory units of the plurality of memory units based on the characteristic data received from the one or more controllers. Further, the host 110 may store data in the allocated one or more memory units.

In accordance with the present embodiment, it is possible to reduce the processing burden of the host 110 during a booting operation of the data processing system 100. Furthermore, while the one or more controllers of the controller group 150 sense the plurality of memory units of the memory pool 170, set the operation modes of the memory units, and perform memory training, the host 110 may perform another booting operation. Therefore, the booting time of the data processing system 100 may be shortened.

Figure 4:
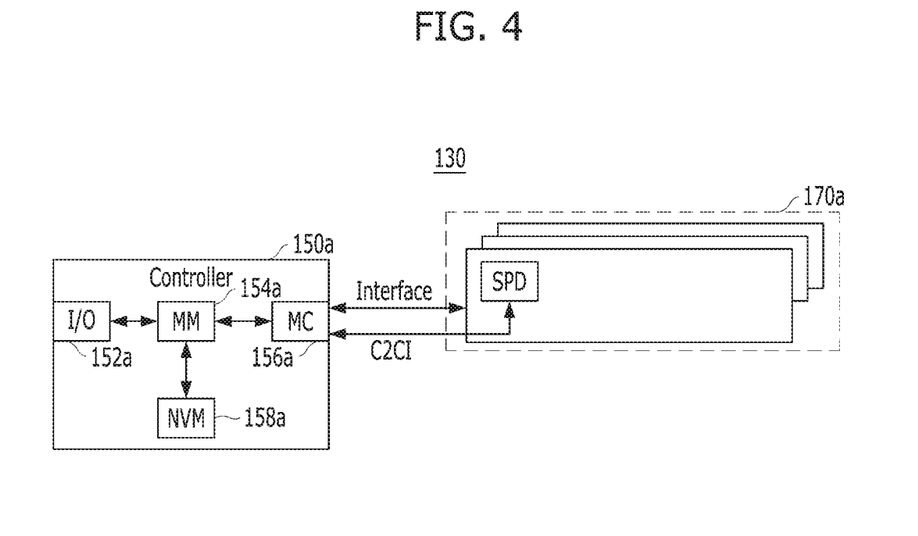
FIG. 4 illustrates a structure of a memory system in a data processing system in accordance with an embodiment.

FIG. 4 schematically illustrates another structure of the memory system 130 in the data processing system 100 in accordance with an embodiment.

FIG. 4 schematically illustrates only the first controller 150a in the memory system 130 and the first memory group 170a electrically coupled to the first controller 150a.

In an embodiment, the first controller 150a may further include a nonvolatile memory (NVM) device 158a electrically coupled to the memory manager (MM) 154a, in addition to the I/O interface 152a, the memory manager 154a and the memory controller (MC) 156a. In an embodiment, the nonvolatile memory device 158a may be included in the first controller 150a. Alternatively, the nonvolatile memory device 158a may be provided externally to the first controller 150a and electrically coupled to the first controller 150a.

In an embodiment, the nonvolatile memory device 158a may store the characteristic data which the memory manager 154a has acquired from the SPD components of the memory units of the first memory group 170a. The nonvolatile memory device 158a may store the operation mode setting data and the memory training result data of the memory units of the first memory group 170a. In an embodiment, the nonvolatile memory device 158a may store the characteristic data, the operation mode setting data and the memory training result data of the memory units of the first memory group 170a in association with one another.

The structures of the second and third controllers 150b and 150c may correspond to the structure of the first controller 150a. That is, each of the second and third controllers 150b and 150c may include a nonvolatile memory device for storing the characteristic data, the operation mode setting data and the memory training result data. Regardless of whether a nonvolatile memory device is included in each of the controllers or provided externally to the controller, it is to be understood that the nonvolatile memory devices are associated with the respective controllers. Thus, the following description is based on the supposition that a corresponding nonvolatile memory device is included in each of the one or more controllers.

In an embodiment, each of the one or more controllers may acquire characteristic data from the SPD components of the memory units electrically coupled thereto, when power is supplied to the memory system 130. Furthermore, each of the one or more controllers may compare the acquired characteristic data to the characteristic data, which is stored in the nonvolatile memory device 158a included therein to determine whether each of the memory units has ever been included in the memory system 130. Based on the determination result, each of the one or more controllers may use the operation mode setting data and the memory training result data which are stored in the internal nonvolatile memory device to quickly complete the operation mode setting and memory training between a memory unit and the controller electrically coupled to the memory unit.

Figure 5:
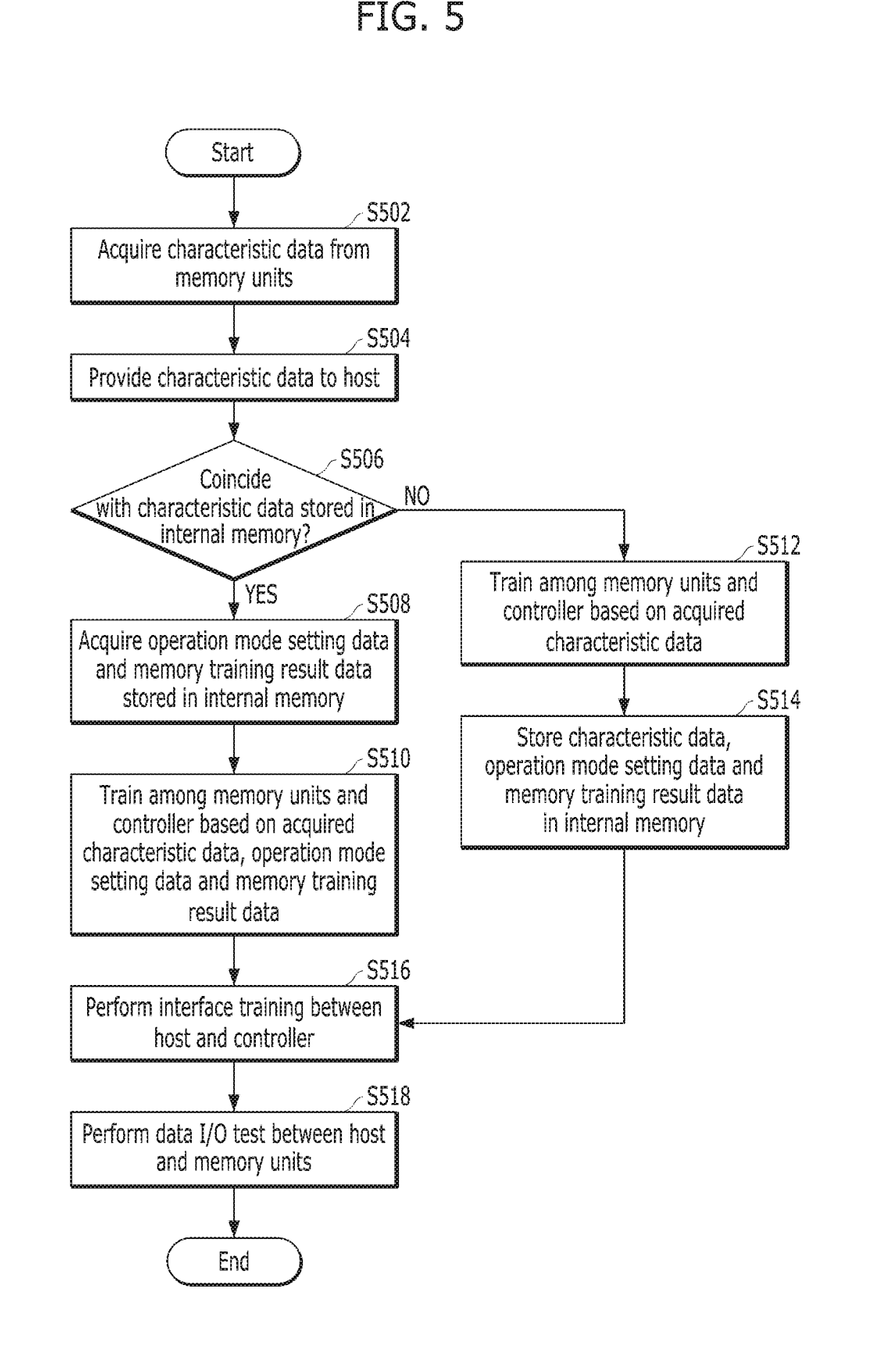
FIG. 5 is a flowchart illustrating an operation of a data processing system in accordance with an embodiment.

FIG. 5 is a flowchart illustrating an operation of the data processing system 100 in accordance with an embodiment.

Referring to FIG. 5, when power is supplied to the data processing system 100, the one or more controllers of the controller group 150 may sense the plurality of memory units in the memory pool 170 by acquiring characteristic data from the SPDs of the respective memory units, in step S502.

In step S504, the one or more controllers may provide the characteristic data to the host 110. In order to perform step S504, the BIOS 112 may complete initial training of the I/O interface 114 in advance.

In step S506, each of the one or more controllers may determine whether characteristic data stored in the internal nonvolatile memory device coincide with the characteristic data acquired from the SPD components.

The characteristic data of the respective memory units may coincide with the characteristic data stored in the nonvolatile memory device, or not coincide with the characteristic data stored in the nonvolatile memory device. A memory unit whose characteristic data coincides with the characteristic data stored in the nonvolatile memory device may be a memory unit which has ever been included in the memory system 130. A memory unit whose characteristic data does not coincide with the characteristic data stored in the nonvolatile memory device may be a new memory unit which has never been included in the memory system 130.

When it is determined that the memory unit whose characteristic data coincides with the characteristic data stored in the nonvolatile memory device ("YES" in step S506), the one or more controllers may perform steps S508 and S510.

Specifically, the nonvolatile memory device may store operation mode setting data and memory training result data which are associated with the characteristic data of the corresponding memory unit, before power is supplied to the data processing system 100.

Therefore, in step S508, each of the one or more controllers may acquire the operation mode setting data and the memory is training result data of a memory unit from the internal nonvolatile memory device, among memory units electrically coupled to the one or more controllers. The memory unit may have the characteristic data which coincides with the characteristic data stored in the nonvolatile memory device.

In step S510, the one or more controllers may use the operation mode setting data and the memory training result data, thereby reducing the time required for the operation mode setting and the memory training.

When it is determined that the memory unit whose characteristic data does not coincide with the characteristic data stored in the nonvolatile memory device ("NO" in step S506), the one or more controllers may perform steps S512 and S514.

Specifically, the nonvolatile memory device may not store the characteristic data of the corresponding memory unit and the memory training result data of the corresponding memory unit.

Therefore, in step S512, each of the one or more controllers may set the operation mode of the corresponding memory unit and perform memory training of the corresponding memory unit, among the memory units electrically coupled to the controller, based on the characteristic data. The characteristic data may be acquired from the SPD component of the memory unit whose characteristic data does not coincide with the characteristic data stored in the nonvolatile memory device.

In step S514, each of the one or more controllers may store the set operation mode setting data and the memory training result data in the internal nonvolatile memory device.

In step S516, the host 110 may perform fine training of the I/O interface 114, i.e., interface training.

In step S518, the host 110 may provide read and write commands to the memory units in the memory pool 170, in order to perform a data I/O test.

When steps S502 to S518 are completed, the host 110 may allocate one or more memory units of the plurality of memory units based on the characteristic data received from the one or more controllers, and store data in the allocated one or more memory units.

In accordance with the present embodiment, the processing burden of the host 110 may be reduced during the booting operation of the data processing system 100. Furthermore, the one or more controllers may quickly perform the memory training of the memory units in the memory system 130 by storing the memory training result data of the memory units, thereby reducing the booting time of the data processing system 100.

A server system to which the above-described data processing system 100 is applied, e.g., a data processing system 10 having a rack scale structure, is described with reference to FIGS. 6 to 8.

Figure 6:
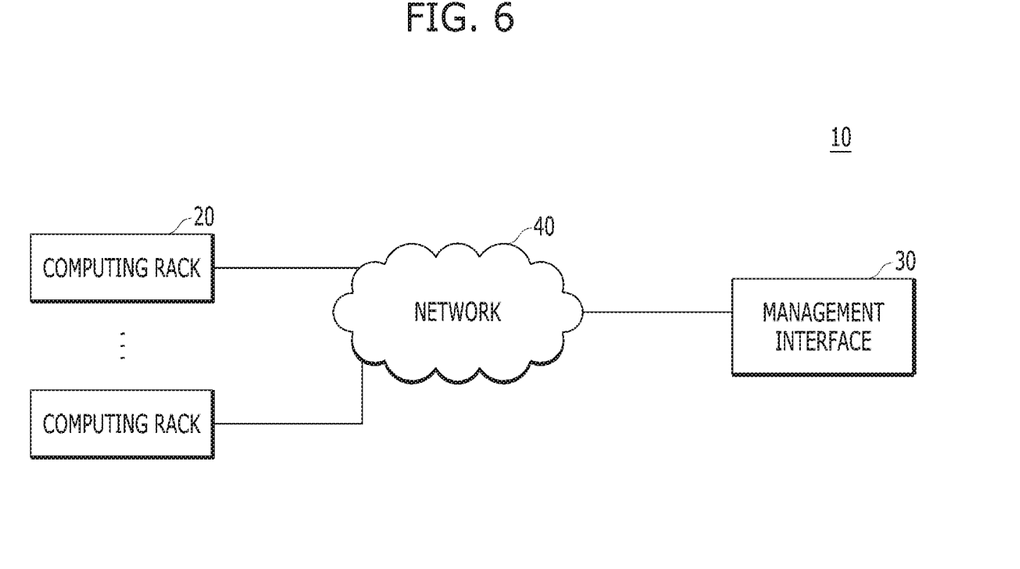
FIGS. 6 to 8 illustrate structures of data processing systems in accordance with embodiments.

FIG. 6 is a block diagram illustrating a data processing system 10.

Referring to FIG. 6, the data processing system 10 may include a plurality of computing racks 20, a management interface 30, and a network 40 for communication between the computing racks 20 and the management interface 30. The data processing system 10 having this rack scale architecture may be used by a data center for processing large-scale data.

Each of the computing racks 20 may individually implement one computing device. Alternatively, each of the computing racks 20 may be combined with one or more other computing racks to implement one computing device. Example structures and operations of the computing racks 20 are described below.

The management interface 30 may provide an interactive interface for a user to control, administrate, or manage the data processing system 10. The management interface 30 may be implemented as any type of a computing device that includes any of a computer, a multi-processor system, a server, a rack-mount server, a board server, a lap-top computer, a notebook computer, a tablet computer, a wearable computing device, a network device, a web device, a distributed computing system, a processor-based system, a consumer electronic device, and the like.

In some embodiments of the present invention, the management interface 30 may be implemented as a distributed system having operation functions which may be performed by the computing racks 20 or as having user interface functions which may be performed by the management interface 30. In other embodiments of the present invention, the management interface 30 may be implemented as a virtual cloud server that includes multi-computing devices distributed through the network 40. The management interface 30 may include a processor, an input/output subsystem, a memory, a data storage device, a communication circuit, and the like.

The network 40 may provide a data interface between the computing racks 20 and the management interface 30 and/or among the computing racks 20. The network 40 may be implemented with an appropriate number of various wired and/or wireless networks. For example, the network 40 may include a publicly accessible global network, such as a wired or wireless local area network (LAN), a wide area network (WAN), a cellular network, and/or the Internet. In addition, the network 40 may include an appropriate number of auxiliary network devices, such as auxiliary computers, routers, switches, and the like.

Figure 7:
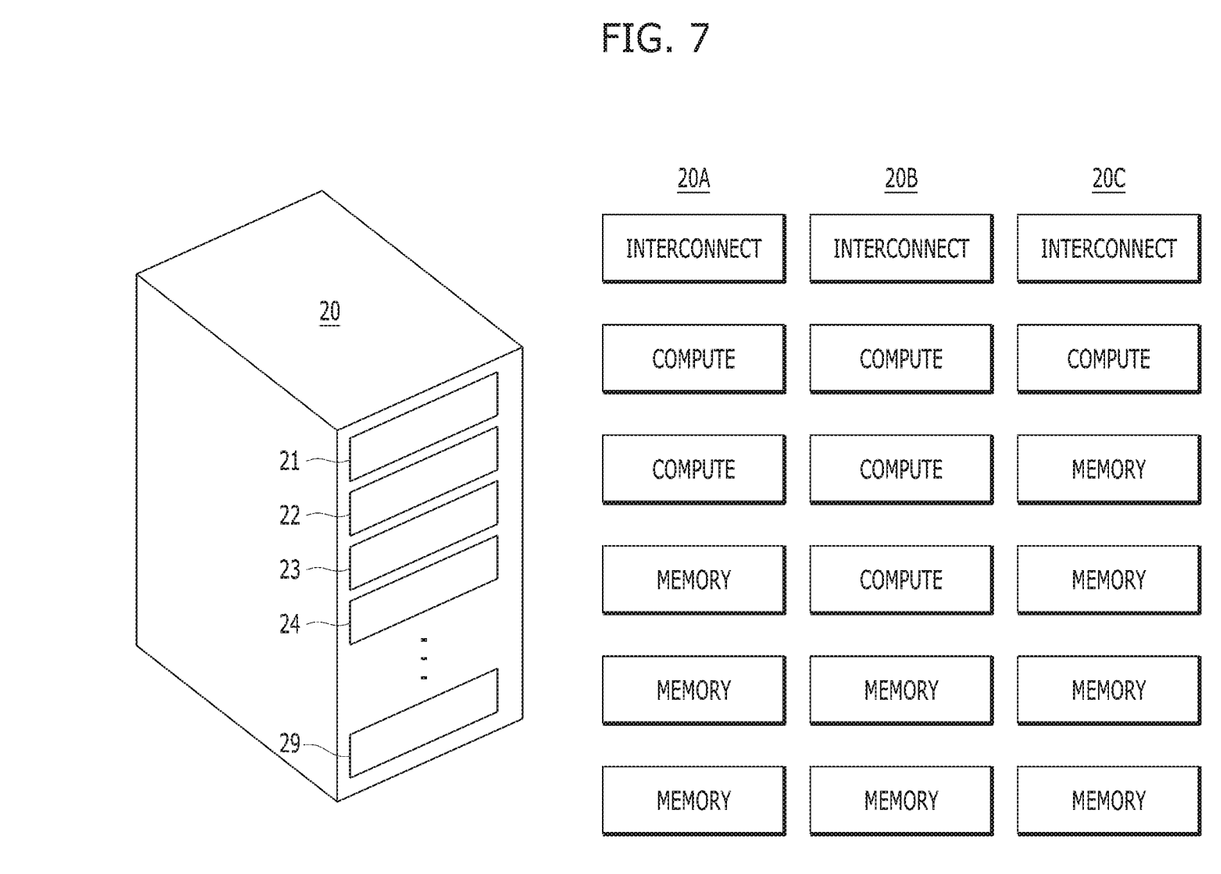

FIG. 7 illustrates an architecture of a computing rack 20 in accordance with an embodiment of the present invention.

Referring to FIG. 7, the computing rack 20 may include constituent elements in various forms and structures. For example, the computing rack 20 may include a plurality of drawers 21 to 29. Each of the drawers 21 to 29 may include a plurality of modules, each of which may include a plurality of boards.

In various embodiments of the present invention, the computing rack 20 may be implemented by a combination of appropriate numbers of compute boards, memory boards, and/or interconnect boards. In other embodiments, the computing rack 20 may be implemented by other elements such as drawers, modules, trays, boards, sashes, or other suitable units. The computing rack 20 may have a structure in which its constituent elements are disaggregated and classified according to their functions. The computing rack 20 may have a structure of an interconnect board, a compute board, and a memory board with a top down classification order, although the computing rack 20 is not limited to such structure. The computing rack 20 and a computing device including the computing rack 20 may be referred to as a rack-scale system or a disaggregated system.

In an embodiment of the present invention, a computing device may be implemented as one computing rack 20. In other embodiments, the computing device may be implemented by all or some constituent elements of two or more computing racks 20, or some constituent elements of one computing rack 20.

In various embodiments of the present invention, a computing device may be implemented by a combination of appropriate numbers of compute boards, memory boards, and interconnect boards that are included in the computing rack 20. As illustrated in FIG. 7, a computing rack 20A may include two compute boards, three memory boards, and one interconnect board. As another example, a computing rack 20B may include three compute boards, two memory boards, and one interconnect board. As still another example, a computing rack 20C may include one compute board, four memory boards, and one interconnect board.

Although FIG. 7 illustrates examples in which the computing rack 20 includes appropriate numbers of compute boards, memory boards, and interconnect boards, the computing rack 20 may include additional constituent elements that may be included in typical servers, such as a power system, a cooling system, an input/output device, and the like.

Figure 8:
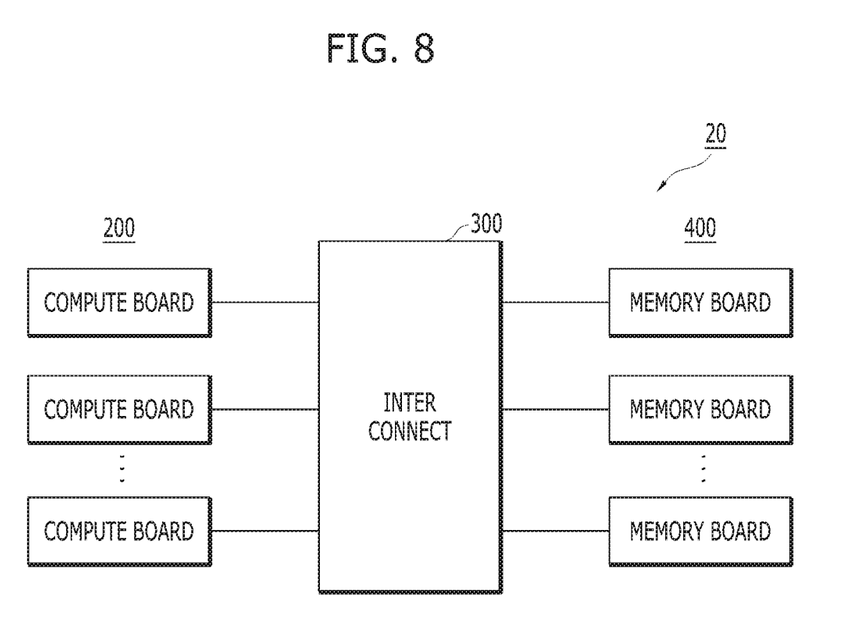

FIG. 8 illustrates a computing rack 20 in accordance with an embodiment of the present invention.

Referring to FIG. 8, the computing rack 20 may include a plurality of compute boards 200, a plurality of memory boards 400, and an interconnect board 300. The compute boards 200 may be pooled compute boards or pooled compute systems. The memory boards may be pooled memory boards or pooled memory systems. The computing device 100 may also be implemented by elements such as drawers, modules, trays, boards, sashes, or other suitable units.

Each of the compute boards 200 may include processing elements such as one or more processors, processing/control circuits and central processing units (CPUs). The host 110 described with reference to FIG. 1 may correspond to the compute board 200.

Each of the memory boards 400 may include various types of memories such as a plurality of volatile memories and/or nonvolatile memories. For example, each of the memory boards 400 may include a plurality of dynamic random access memories (DRAMs), flash memories, memory cards, hard disk drives (HDDs), solid state drives (SSDs) and/or combinations thereof.

The memory system 130 described with reference to FIGS. to 5 may correspond to each of the memory boards 400. In accordance with an embodiment, each of the memory boards 400 may acquire characteristic data of a plurality of memory units included therein, and provide the acquired data to the compute board 200. The memory board 400 may set the operation modes of the plurality of memory units, based on the characteristic data. The memory board 400 may perform memory training between a controller included therein and each of the memory units. The memory board 400 may store the characteristic data, operation mode setting data and memory training result data in an internal nonvolatile memory device.

The compute board 200 may perform data I/O on the individual memory units when the interface training of the interconnect board 300 is completed. For example, the compute board 200 may allocate one or more memory units of the memory units included in each of the memory boards 400 based on the characteristic data, and store data in the allocated one or more memory units.

In accordance with an embodiment, during a booting operation of the computing rack 20, the processing burden of the compute board 200 may be reduced, and the booting performance of the computing rack 20 may be improved.

Each of the memory boards 400 may be divided, allocated, or designated by and used by one or more processing elements that are included in each of the compute boards 200. Also, each of the memory boards 400 may store one or more operating systems (OS) that may be initialized and/or executed by the compute boards 200.

The interconnect board 300 may include a communication circuit, a communication device, or a combination thereof, which may be divided, allocated, or designated by and used by one or more processing elements included in each of the compute boards 200. For example, the interconnect board 300 may be implemented by any suitable number of network interface ports, interface cards, or interface switches. The interconnect board 300 may use protocols related to one or more wired communication technologies for communication. For example, the interconnect board 300 may support communication between the compute boards 200 and the memory boards 400 based on one or more of protocols such as peripheral component interconnect express (PCIe), QuickPath interconnect (QPI), Ethernet, and the like.

In accordance with embodiments, it is possible to provide a memory system capable of sensing a plurality of memory units during a booting operation of a data processing system, setting the operation modes of the memory units, and shortening the time required for performing memory training, a data processing system including the memory system, and an operating method of the data processing system.

Although various embodiments have been illustrated and described, it will be apparent to those skilled in the art in light of the present disclosure that various changes and modifications may be made without departing from the spirit and scope of the invention as defined in the following claims.

What is claimed is:

1. A data processing system comprising:
a host including an I/O interface; and
a memory system comprising a plurality of memory units and a controller coupled to the plurality of memory units,
wherein the controller comprises a memory manager configured to acquire characteristic data from serial presence detect (SPD) components in the plurality of memory units when power is supplied, providing the characteristic data to the host, set an operation mode of each of the plurality of memory units based on the characteristic data, and perform memory training, and
wherein the I/O interface interfaces between the host and the memory system, and the host performs interface training of the I/O interface.

2. The data processing system of claim 1, wherein the controller further comprises a nonvolatile memory device configured to store the characteristic data, operation mode setting data associated with the setting of the operation modes and memory training result data indicating a result of performing the memory training.

3. The data processing system of claim 2, wherein the memory manager acquires, from the nonvolatile memory device, the operation mode setting data and the memory training result data of a memory unit of the plurality of memory units, in which the characteristic data acquired from the corresponding SPD component coincides with the characteristic data stored in the nonvolatile memory device, sets the operation mode of the memory unit based on the operation mode setting data, and performs the memory training of the memory unit based on the memory training result data.

4. The data processing system of claim 1, wherein the host further performs a data input and output (I/O) test with the plurality of memory units.

5. The data processing system of claim 1, wherein the memory system further comprises a chip-to-chip interface configured to support communication between the controller and each of the SPD components in the plurality of memory units.

6. The data processing system of claim 1, wherein the memory manager provides the host with the characteristic data in a table format which includes a type of a memory unit of the plurality of memory units and types, operation timing information, capacity information and manufacturing information of memory devices in the memory unit as fields.

7. A memory system comprising:
a plurality of memory units; and
a controller coupled to the plurality of memory units,
wherein the controller comprises a memory manager configured to acquire characteristic data from serial presence detect (SPD) components of the plurality of memory units when power is supplied, providing the characteristic data to a host, set an operation mode of each of the plurality of memory units based on the characteristic data, and perform memory training, wherein the host includes an I/O interface and the I/O interface interfaces between the host and the memory system, and the host performs interface training of the I/O interface.

8. The memory system of claim 7, wherein the controller further comprises a nonvolatile memory device configured to store the characteristic data, operation mode setting data associated with the setting of the operation mode and memory training result data indicating a result of performing the memory training.

9. The memory system of claim 8, wherein the memory manager acquires, from the nonvolatile memory device, the operation mode setting data and the memory training result data of a memory unit of the plurality of memory units, in which the characteristic data acquired from the corresponding SPD component coincides with the characteristic data stored in the nonvolatile memory device, sets the operation mode of the memory unit based on the operation mode setting data, and performs the memory training of the memory unit based on the memory training result data.

10. The memory system of claim 7, further comprising a chip-to-chip interface configured to support communication between the controller and each of the SPD components in the memory units.

11. The memory system of claim 7, wherein the memory manager provides the host with the characteristic data in a table format which includes a type of a memory unit of the plurality of memory units and types, operation timing information, capacity information and manufacturing information of memory devices in the memory unit as fields.

12. A data processing system comprising:
a host including an I/O interface; and
a memory system including a memory pool and a controller group coupled to the memory pool, the memory pool including a plurality of memory groups, each memory group including a plurality of memory units, each of the plurality of memory units including a serial presence detect (SPD) component for storing characteristic data, the controller group including a plurality of controllers, each of the controllers coupled to a corresponding memory group,
wherein each of the controllers comprises a memory manager configured to:
scan the corresponding memory group, when power is supplied, to acquire characteristic data from SPD components of the corresponding memory group;
perform memory training for the corresponding memory group based on the acquired characteristic data; and
provide, to the host, the characteristic data of memory units of the corresponding memory group associated with the memory training, and
wherein the I/O interface interfaces between the host and the memory system, and the host performs interface training of the I/O interface and performs data input and output testing for memory units of the corresponding memory group.

* * * * *